United States Patent
Trutna, Jr. et al.

(10) Patent No.: US 7,440,113 B2
(45) Date of Patent: Oct. 21, 2008

(54) LITTROW INTERFEROMETER

(75) Inventors: William R Trutna, Jr., Atherton, CA (US); Geraint Owen, Palo Alto, CA (US); Alan B Ray, Palo Alto, CA (US); James Prince, Clovis, CA (US); Eric Stephen Johnstone, Redwood City, CA (US); Miao Zhu, San Jose, CA (US); Leonard S Cutler, Los Altos Hills, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 79 days.

(21) Appl. No.: 11/316,855

(22) Filed: Dec. 23, 2005

(65) Prior Publication Data

US 2007/0146722 A1 Jun. 28, 2007

(51) Int. Cl.
*G01D 5/36* (2006.01)
*G01N 11/02* (2006.01)

(52) U.S. Cl. .................................. 356/499; 250/237 G

(58) Field of Classification Search ............... 356/496, 356/498, 499, 500, 505, 508, 510, 521, 494, 356/509; 250/237 G
See application file for complete search history.

(56) References Cited

U.S. PATENT DOCUMENTS

| | | | | |
|---|---|---|---|---|
| 3,090,279 A | * | 5/1963 | Chisholm | 356/499 |
| 3,891,321 A | * | 6/1975 | Hock | 356/488 |
| 4,436,424 A | * | 3/1984 | Bunkenburg | 356/498 |
| 4,512,661 A | * | 4/1985 | Claus et al. | 356/493 |
| 4,670,646 A | * | 6/1987 | Spivey | 356/521 |
| 4,682,893 A | * | 7/1987 | Armandillo et al. | 356/521 |
| 4,930,895 A | * | 6/1990 | Nishimura et al. | 356/494 |
| 5,341,213 A | * | 8/1994 | Giroux | 356/509 |
| 5,604,592 A | * | 2/1997 | Kotidis et al. | 356/493 |
| 6,111,645 A | * | 8/2000 | Tearney et al. | 356/499 |
| 6,407,815 B2 | * | 6/2002 | Akihiro | 356/499 |
| 6,469,790 B1 | * | 10/2002 | Manning | 356/451 |
| 6,483,593 B1 | * | 11/2002 | Bell et al. | 356/487 |
| 6,744,520 B2 | * | 6/2004 | Chang et al. | 356/499 |
| 6,819,425 B2 | | 11/2004 | Kwan | |

(Continued)

FOREIGN PATENT DOCUMENTS

CN 1699914 A 11/2005

(Continued)

OTHER PUBLICATIONS

Lotem, "Littrow-mounted diffraction grating cavity," Feb. 20, 1994, Applied Optics, vol. 33, No. 6, pp. 930-934.*

(Continued)

*Primary Examiner*—Patrick Connolly
*Assistant Examiner*—Scott M Richey
(74) *Attorney, Agent, or Firm*—June L. Bouscaren

(57) ABSTRACT

An apparatus and method for measuring displacement includes a light beam directed to an interferometer core that splits the light beam into first and second component beams. The first component beam is directed to a diffraction grating at approximately a Littrow angle. A diffraction is received by the interferometer core and is combined with the second component beam. The combination of the first and second component beams is measured to determine displacement of the diffraction grating.

56 Claims, 13 Drawing Sheets

U.S. PATENT DOCUMENTS

| | | | |
|---|---|---|---|
| 6,897,961 B2 | 5/2005 | Muenter et al. | |
| 7,019,842 B2 * | 3/2006 | Holzapfel et al. | 356/499 |
| 7,126,696 B2 * | 10/2006 | Tobiason | 356/499 |
| 7,342,659 B2 * | 3/2008 | Horn et al. | 356/328 |
| 2004/0227956 A1 * | 11/2004 | Kessler et al. | 356/521 |
| 2005/0068539 A1 * | 3/2005 | Tobiason | 356/499 |
| 2006/0066855 A1 * | 3/2006 | Boef et al. | 356/401 |
| 2007/0058172 A1 * | 3/2007 | Van Der Pasch et al. | 356/494 |

FOREIGN PATENT DOCUMENTS

| | | |
|---|---|---|
| CN | 1702428 A | 11/2005 |
| EP | 0 248 277 A2 | 5/1987 |
| EP | 1 182 509 A2 | 8/2001 |
| JP | 2003294418 A | 4/2002 |

OTHER PUBLICATIONS

Giovannini and Akhouayri, "Interferometric configuration based on a grating interferometer for the measurement of the phase between TE and TM polarization after diffraction by gratings," Nov. 1, 1995, Optics Letters, vol. 20, No. 21, pp. 2255-2257.*

Divoky, Straka, and Bohm, "Off-plane diffraction in pulse stretcher and compressor," 2005, IEEE Conference on Lasers and Electro-Optics Europe, p. 432.*

Kai et al., "Development of Alignment Technology for Segmented Grating," Aug. 2005, IEEE Lasers and Electro-Optics, 2005 Pacific Rim Conference on, pp. 1172-1173.☐☐*

H. Giovannini & H. Akhouayri, "Interferometric configuraion based on a grating interferometer for the measurement of the phase between TE and TM polarizations after diffraction by gratings", Optics Letters; Nov. 1, 1995; vol. 20, No. 21; pp. 2255-2257; XP-002444900.

"A Primer on Displacement Measuring Interferometers"; Zygo; OEM Better Technology, Better Metrology; pp. 1-91, Revised, Jan. 1999.

* cited by examiner

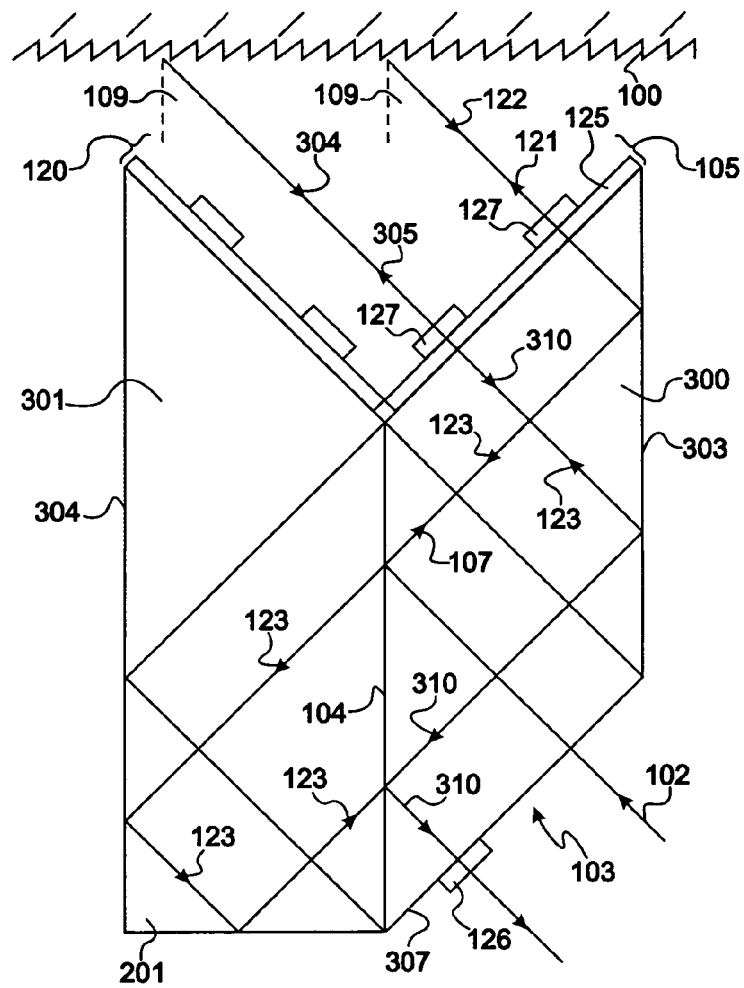
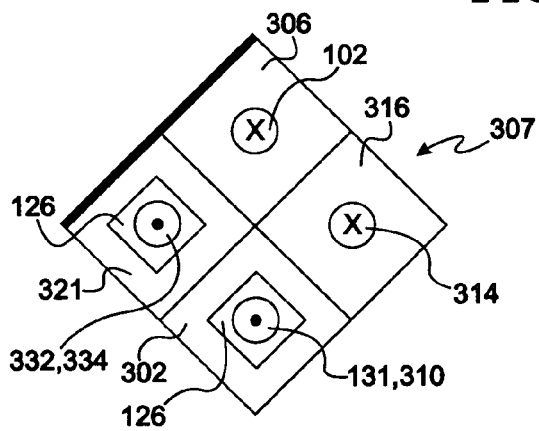
FIG 5
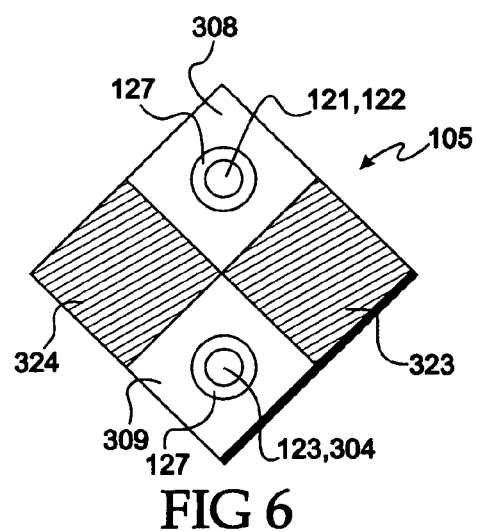
FIG 6
FIG 4

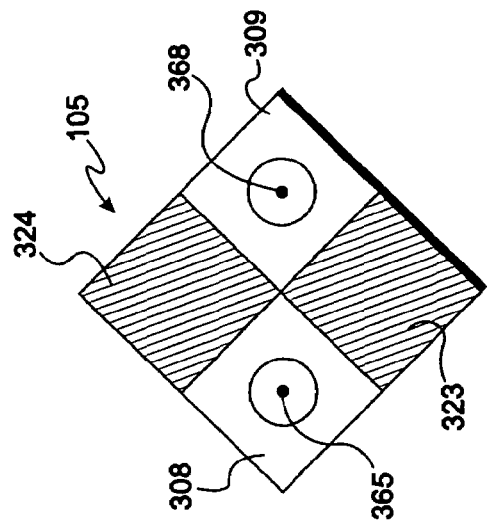
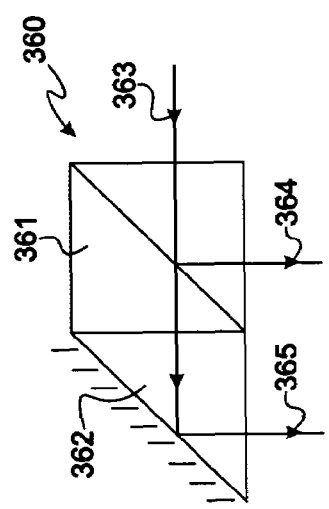
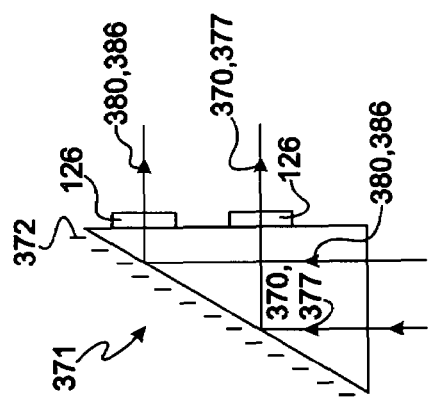
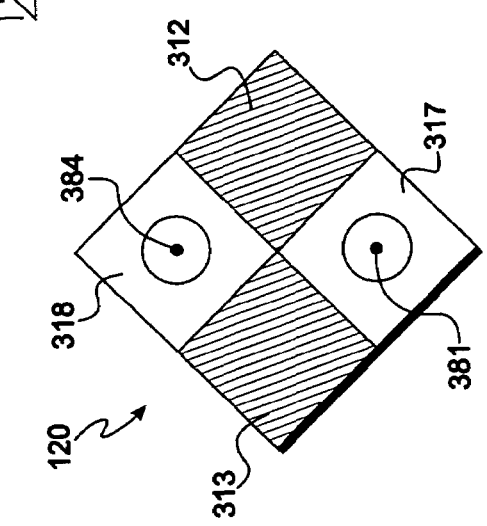

LITTROW INTERFEROMETER

BACKGROUND

Optical interferometry may be used to make precise measurements in a variety of settings. For example, laser interferometry is currently used to measure small displacements and accurately position stages to nanometer precision in photolithographic processing of semiconductors. As features of semiconductors get smaller, there is a need to achieve even more precise displacement measurements. Using known, mirror based laser interferometry, a portion of the measurement light beam travels in air. If the refractive index of the air in the beam path changes, even locally, the change manifests itself as an apparent displacement. This apparent displacement constitutes a measurement error and the longer the air path, the more serious this error is likely to be. There are a number of known methods to control, reduce or measure changes to the refractive index in the air through which the light travels, but new methods are yielding increasingly marginal improvements.

In addition to measuring displacement magnitude, it is also important that a laser interferometer identify displacement direction. Two known methods for determining displacement direction are the homodyne and heterodyne techniques. The homodyne technique uses a single frequency light beam. The direction of motion is inferred by measuring two or more output signals for each object whose motion is being measured, at least one of which is optically retarded with respect to each other: the phase relationship between these signals indicates the direction of motion. The heterodyne technique uses a dual frequency light source. A reference signal is generated that indicates the phase of the signal formed by mixing the two frequencies directly from the source. For each object whose motion is being measured, a second signal is formed by introducing the light of one frequency into the reference branch, and the light of the other frequency into the measurement branch. Displacement is measured by measuring the phase of a signal formed by mixing these two beams and subtracting the phase of the signal formed directly from the two frequency sources. Any change in this phase difference is related to displacement. A Doppler shift of the measurement beam relative to the reference beam indicates the amount and direction of velocity. The heterodyne technique permits the direction of motion to be identified using a single detector and has enhanced immunity to low frequency noise relative to the homodyne technique. Thus, the homodyne scheme uses a simpler source but requires at least two detection channels per measurement axis that must be matched in gain and phase. The heterodyne scheme uses a more complex source, but requires only a single detector for each measurement axis plus a single additional detector for the laser source.

Encoders to measure displacement are also known. Because encoders measure displacement that is transverse to the measurement beam, encoder technology can be used to minimize the need for long air paths. Typically, encoders use the homodyne technique. As an example, a device made by Heidenhain uses a system of three detectors in order to determine the direction of motion. Unfortunately, it is difficult to sufficiently match the gains and phases of the detectors and their associated electronics to allow measurement with nanometer or sub-nanometer precision. This difficulty is exacerbated if the measurement signals travel along cables which flex or move. Accordingly, encoder measurement displacement systems are used for applications that require lower precision than what is currently available with laser interferometry displacement measurement systems. As in the case of interferometers, homodyne encoders are susceptible to low frequency noise.

There remains a need for an improved method and apparatus for measuring and controlling displacement with higher resolution than previously available under the prior art.

BRIEF DESCRIPTION OF THE DRAWINGS

The present teachings are best understood from the following detailed description when read with the accompanying drawing figures. It is emphasized that the various features are not necessarily drawn to scale. In fact, the dimensions may be arbitrarily increased or decreased for clarity of discussion.

FIGS. 4 through 10 illustrate an alternate embodiment of an apparatus according to the present teachings including representations of a travel path of light through the apparatus.

FIGS. 13-18 illustrate another embodiment according to the present teachings.

DETAILED DESCRIPTION

Figure 1:
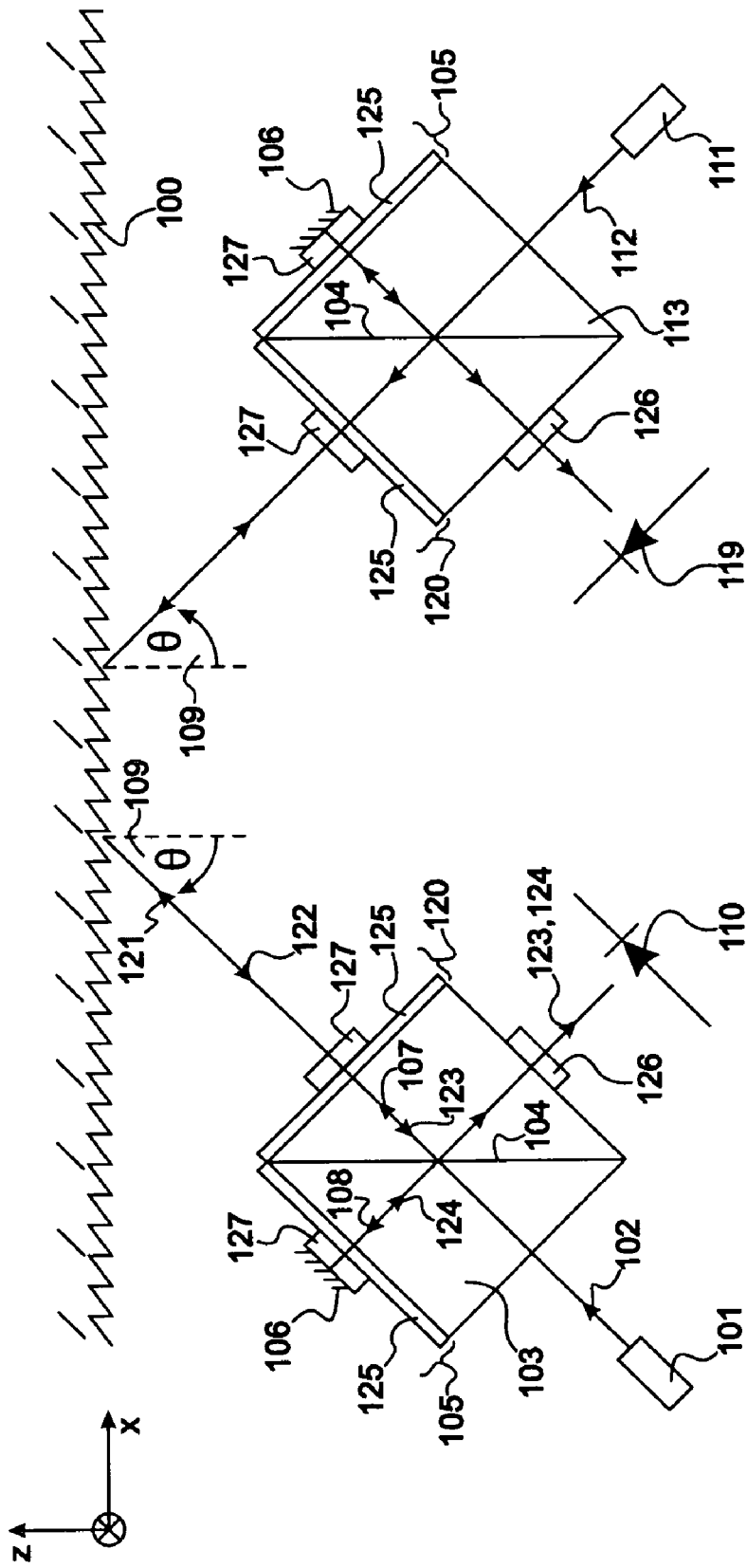
FIG. 1 illustrates a single pass embodiment of an apparatus according to the present teachings.

In the following detailed description, for purposes of explanation and not limitation, example embodiments disclosing specific details are set forth in order to provide an understanding of the present teachings. It will be apparent to one of ordinary skill in the art with benefit of the present disclosure that other embodiments according to the present teachings that depart from the specific details disclosed herein remain within the scope of the appended claims. Moreover, descriptions of well-known apparatus and methods may be omitted so as to not obscure the description of the example embodiments and are considered clearly within the scope of the present teachings. Identical or similar structure is labeled with the same reference number in figures illustrating multiple embodiments according to the present teachings. For purposes of clarity, discrete light beams are shown collapsed upon each other.

Known encoder based displacement measurement systems do not take full advantage of the encoder attribute of requiring only a small air gap. The present teachings exploit this attribute to provide benefit in high precision metrology. Use of a heterodyne technique in conjunction with the encoder provides additional benefit that is apparent with benefit of the present teachings. With specific reference to FIG. 1 of the drawings, there is shown a first embodiment according to the present teachings in which a first light source 101 directs a light beam 102 towards an interferometer core 103. In a specific embodiment, the interferometer core 103 comprises a polarizing beam splitter in combination with additional optics to receive and direct the light beam. The light beam 102 may be either a homodyne or a heterodyne light beam. In a heterodyne embodiment according to the present teachings, the light beam 102 comprises two different frequencies of light, each with orthogonally polarized components referred to as a p-polarized component and an s-polarized component. In a homodyne embodiment according to the present teachings, the light beam 102 comprises a single frequency of light emitting linearly polarized light at substantially 45 degrees relative to the horizontal, so that the s-polarized and p-polarized components are substantially equal. In the heterodyne embodiment, the interferometer core 103 comprises a beam splitter cube with a polarizing beam splitter interface 104. In a specific embodiment, the polarizing beam splitter interface 104 has the property that it transmits light linearly polarized in the p direction (p-polarized light), and reflects light linearly polarized in the s direction (s-polarized light). Attached to two faces of the beam splitter cube 103 are first and second polarization changing devices 105 and 120, respectively. In one embodiment, the polarization changing devices may be quarterwave retarders. In another specific embodiment and the embodiment illustrated in FIG. 1, each polarization changing device 105 and 120 is a combination of a halfwave retarder 125 and a Faraday rotator 127. As one of ordinary skill in the art appreciates, the Faraday rotator 127 is surrounded by an annular magnet. Alternatively, the required magnetic field may be built into the material. It is known that a light beam that is incident on a diffraction grating 100 at a Littrow angle is optimally linearly polarized with the polarization either parallel or perpendicular relative to grooves in the diffraction grating 100. The combination of the halfwave retarder 125 and Faraday rotator 127 can rotate the polarization state to optimize optical properties of the light beam that hits the diffraction grating 100. Each measurement beam traveling towards the diffraction grating 100 has its polarization state aligned independently for optimum performance by rotating a respective one of the polarization changing devices 105, 120. The Faraday rotator 127 rotates the polarization of an input beam by 45 degrees, and the halfwave retarder 125 rotates the beam through an additional angle such that the polarization is either exactly parallel or exactly perpendicular to grooves on the diffraction grating 100. The light beam incident on the diffraction grating 100 is linearly polarized, and the light diffracted from the diffraction grating 100 is linearly polarized in substantially the same direction. After the diffracted beam traverses the combination of the halfwave retarder 125 and the Faraday rotator 127, it is linearly polarized with a polarization perpendicular to the polarization of the light before it first passed through the polarization changing device 105, 120 toward the diffraction grating 100. The positions of the Faraday rotator 127 and the halfwave retarder 125 may be exchanged without changing the function of the polarization changing device 105, 120. The polarization changing device 105, 120 may further include a polarizer (not shown) between the Faraday rotator 127 and the diffraction grating 100. The additional polarizer is able to purify the beam polarization leaving the interferometer core 103 before being incident on the diffraction grating 100 and then again returning to the interferometer core 103 after diffracting from the diffraction grating 100. In the embodiment with the polarizer added as part of the polarization changing device 105, 120, the polarizer defines an output beam orientation relative to the diffraction grating 100. Accordingly, an adjustment that independently optimizes the orientation of each beam comprises a rotation of the halfwave retarder 125 related to the specific beam. In another specific embodiment, the polarization changing device 105 or 120 that is in the measurement beam path comprises the combination of the halfwave retarder 125 and the Faraday rotator 127 with or without the additional polarizer and the polarization changing device 105 or 120 that is part of the reference beam path comprises either a quarterwave retarder with a mirror coating 106 or a combination of the halfwave retarder 125 and the Faraday rotator 127 with a reflective surface 106, such as a mirror bonded to the Faraday rotator 127, to reflect the beam back to the interferometer core 103 without traveling to the diffraction grating 100.

In a specific embodiment, the light 102 is separated by the beam splitter interface 104 according to polarization into first and second component beams, with the first component beam being a measurement beam 107 and the second component beam being a reference beam 108. In the specific embodiment, the measurement beam 107 is the p-polarized component, and the reference beam 108 is the s-polarized component. The p-polarized measurement beam 107 traverses the beam splitter interface 104 and the second polarization changing device 120. An emerging measurement beam 121 is incident on the diffraction grating 100 having a pitch p at a Littrow angle 109, here denoted by θ. When a light beam is directed to a diffraction grating having a pitch, p, at the Littrow angle 109, the diffracted light beam is collinear with the incident light beam. If the wavelength of the light beam 102 is λ, the Littrow angle 109 is given by:

$$\theta = \sin^{-1}\left(\frac{\lambda}{2p}\right) \quad (1)$$

Accordingly, in the illustrated embodiment, the measurement beam 121 directed toward the diffraction grating 100 at the Littrow angle is diffracted from the diffraction grating 100 as diffracted measurement beam 122 which is substantially collinear with the incident measurement beam 121. The diffracted measurement beam 122 traverses the second polarization changing device 120 again causing the measurement beam to become s-polarized. The s-polarized diffracted measurement beam 123 reflects at the beam splitter interface 104 and exits the interferometer core 103 through mixing polarizer 126. In a practical embodiment, the frequency of the light source 101 may be tuned to compensate for small variations in the pitch of the diffraction grating 100 in order to ensure that the Littrow condition is satisfied.

The s-polarized component of the light beam 102 is the reference beam 108, which enters the beam splitter cube 103 and reflects at the beam splitter interface 104 toward the first polarization changing device 105. The s-polarized reference beam 108 traverses the first polarization changing device 105, is reflected at reflective surface 106, traverses the polarization changing device 105 a second time and emerges as p-polarized reflected reference beam 124. The p-polarized reflected reference beam 124 transmits through the beam splitter interface 104. The s-polarized reflected measurement beam 123 and the p-polarized reflected reference beam 124 that exit the beam splitter cube 103 are substantially collinear. Mixing polarizer 126 is disposed at an exit face of the beam splitter cube 103 causing the measurement and reference beams 123, 124 to combine and interfere. The optical power in the combined reference and measurement beams 124, 123 is detected and measured at the detector 110. Because the measurement and reference beams 123, 124 have different frequencies, the output of the detector 110 responds to a beat frequency of the combined signal and cycles between high and low levels corresponding to constructive and destructive interference of the measurement and reference beams 123, 124. The frequency of the beat signal is equal to the difference in frequency between the measurement and reference beams 123, 124 if the diffraction grating 100 is stationary. When the diffraction grating 100 moves, additional cycles appear at the detector 110, and each of these additional cycles, commonly known as a "fringe", is denoted by N. With reference to directional axes x- and z-, if the diffraction grating 100 moves a distance Δx in the x-direction and moves a distance Δz in the z-direction, the number of fringes, $N_1$, recorded at the detector 110 is $$N_1 = \frac{\Delta x}{p} + \frac{\Delta z}{p}|\cot\theta| \qquad (2)$$

Because N, depends on both Δx and Δz, if the diffraction grating 100 is constrained either to move only in the x-direction or only in the z-direction, its displacement can be deduced from equation (2). However, if the diffraction grating 100 can move in both x- and z-directions simultaneously, the individual values of Δx and Δz cannot be determined from the single fringe count $N_1$. A method for overcoming this limitation adds a second interferometer system for a second fringe measurement, $N_2$, and solves the two equations with the two unknowns.

According to another embodiment and with further reference to FIG. 1 of the drawings, it is possible to detect displacement in two dimensions by adding a second measurement system. The second measurement system is similar to the first and includes a second light source 111, second light beam 112, second polarizing beam splitter cube 113 having the beam splitter interface 104, first and second polarization changing optical devices 105, 120, respectively, the first polarization changing device having the reflective surface 106, mixing polarizer 126, and a second detector 119. The paths of travel for the s- and p-polarized components of the light beam 112 are identical to that described with respect to the first interferometer core 103. For this second interferometer core 113, the relationship between fringe count $N_2$ and the displacements Δx and Δz is $$N_2 = -\frac{\Delta x}{p} + \frac{\Delta z}{p}|\cot\theta| \qquad (3)$$

Solving equations (2) and (3) simultaneously leads to the results $$\Delta x = \frac{p}{2}(N_1 - N_2) \text{ and } \Delta z = \frac{p}{2}(N_1 + N_2)|\tan\theta| \qquad (4)$$

Thus, the addition of the second interferometer core 113 allows displacements in the x-direction and z-direction to be determined simultaneously. Because the x-direction measurement is computed by taking a difference in the two fringe counts, error sources that are common to both fringe counts cancel. As an example, a change in a refractive index of the air causes equal fringe counts in both interferometers, which are subtracted when computing the x-direction displacement according to equation (4). Similarly, a change in a wavelength of the light source produces a common mode error, which is cancelled by subtraction.

Figure 2:
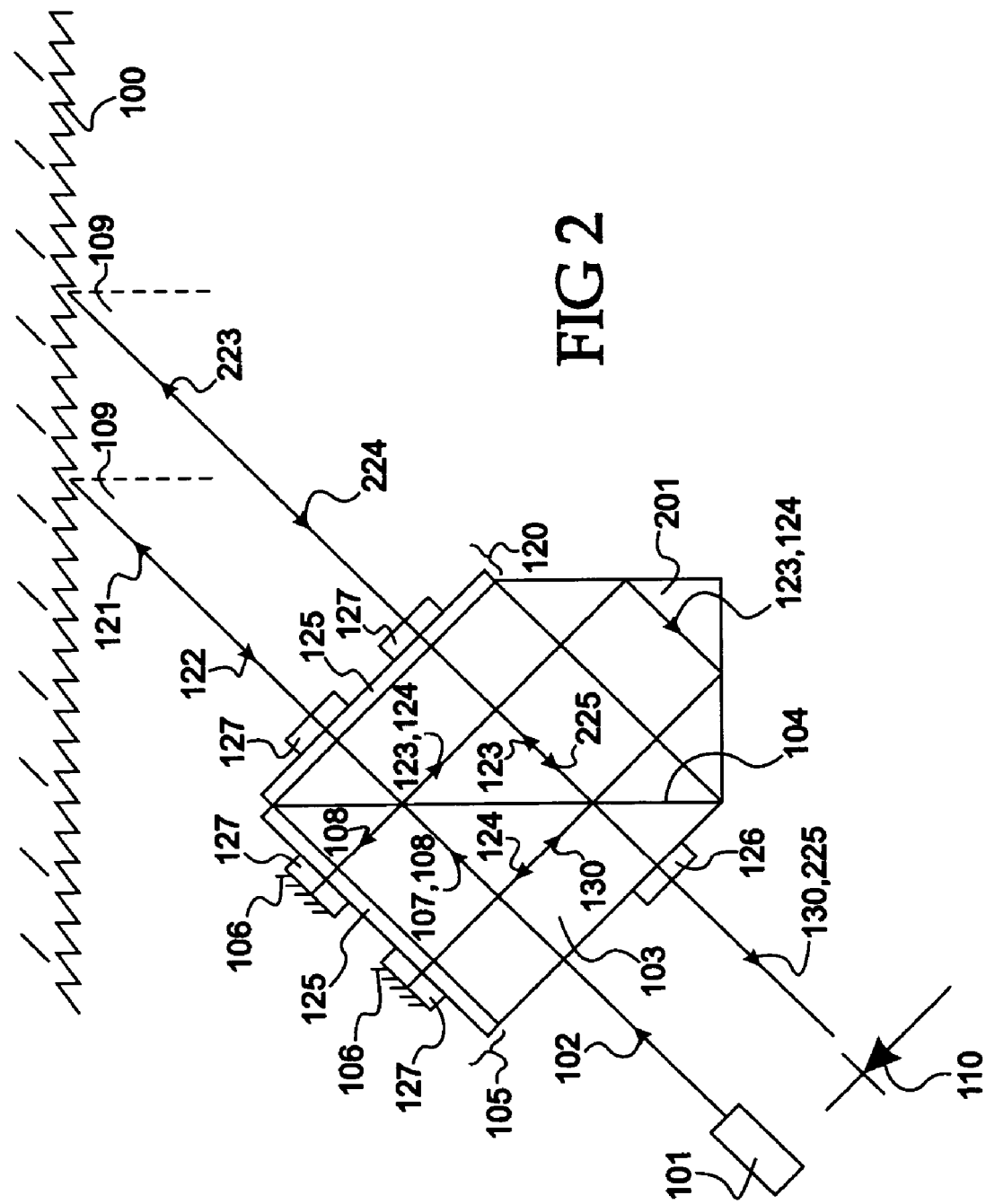
FIG. 2 illustrates a two pass embodiment of an apparatus according to the present teachings.

With specific reference to FIG. 2 of the drawings, the teachings of FIG. 1 may be adapted for two pass operation by adding a retroreflector 201 to the face of the cube opposite the first polarization changing element 105 and replacing the mixing polarizer 126 shown in FIG. 1 of the drawings. An embodiment of a suitable retroreflector 201 is disclosed in U.S. Pat. No. 6,736,518 to Belt the contents of which hereby incorporated by reference. Beneficially, the two pass operation decreases alignment sensitivity to tilt of the diffraction grating 100. In the embodiment shown and described, the light source 101 generates a heterodyne beam of light 102 having two orthogonally polarized light components. The measurement beam 107 comprises the p-polarized component of the light 102 emitted from the light source 101. The measurement beam 107 traverses the beam splitter interface 104 and the second polarization changing device 120 and the emerging measurement beam 121 hits the diffraction grating 100 at the Littrow angle 109. The diffraction 122 of the emerging measurement beam 121 traverses the second polarization changing device 120 causing the beam 122 to become s-polarized. The s-polarized diffracted measurement beam 123 reflects at the beam splitter interface 104, travels through the retroreflector 201, reflects again at the beam splitter interface 104, and traverses the second polarization changing element 120. A second pass emerging measurement beam 223 is incident at the diffraction grating 100 at the Littrow angle 109. A diffraction of the second pass emerging measurement beam 223 is co-linear with the incident beam and traverses the second polarization changing device 120 again to become a second pass p-polarized measurement beam 225. The second pass p-polarized measurement beam 225 traverses the beam splitter interface 104 and the mixing polarizer 126 to the detector 110.

The reference beam 108 comprises the s-polarized component of the light 102 emitted from the light source 101. The reference beam 108 is reflected at the beam splitter interface 104 and traverses the first polarization changing device 105. The reference beam 108 reflects at the reflective surface 106 and traverses the first polarization changing device 105 again, becoming p-polarized. The p-polarized reflected reference beam 124 traverses the beam splitter interface 104, into the retroreflector 201, and through the beam splitter interface 104 to the first polarization changing device 105. After passing through the first polarization changing device 105, the beam reflects at the reflective surface 106 of the first polarization changing device 105 and traverses the first polarization changing device 105 again to become s-polarized. The s-polarized reflected reference beam 130 is reflected at the beam splitter interface 104 and is combined with the p-polarized measurement beam 225 at the mixing polarizer 126 for detection and measurement at detector 110. As one of ordinary skill in the art appreciates, a second system may be added to the embodiment of FIG. 2 in a manner similar to that shown in FIG. 1 of the drawings to detect displacement in the x- and z-directions simultaneously.

Figure 3:
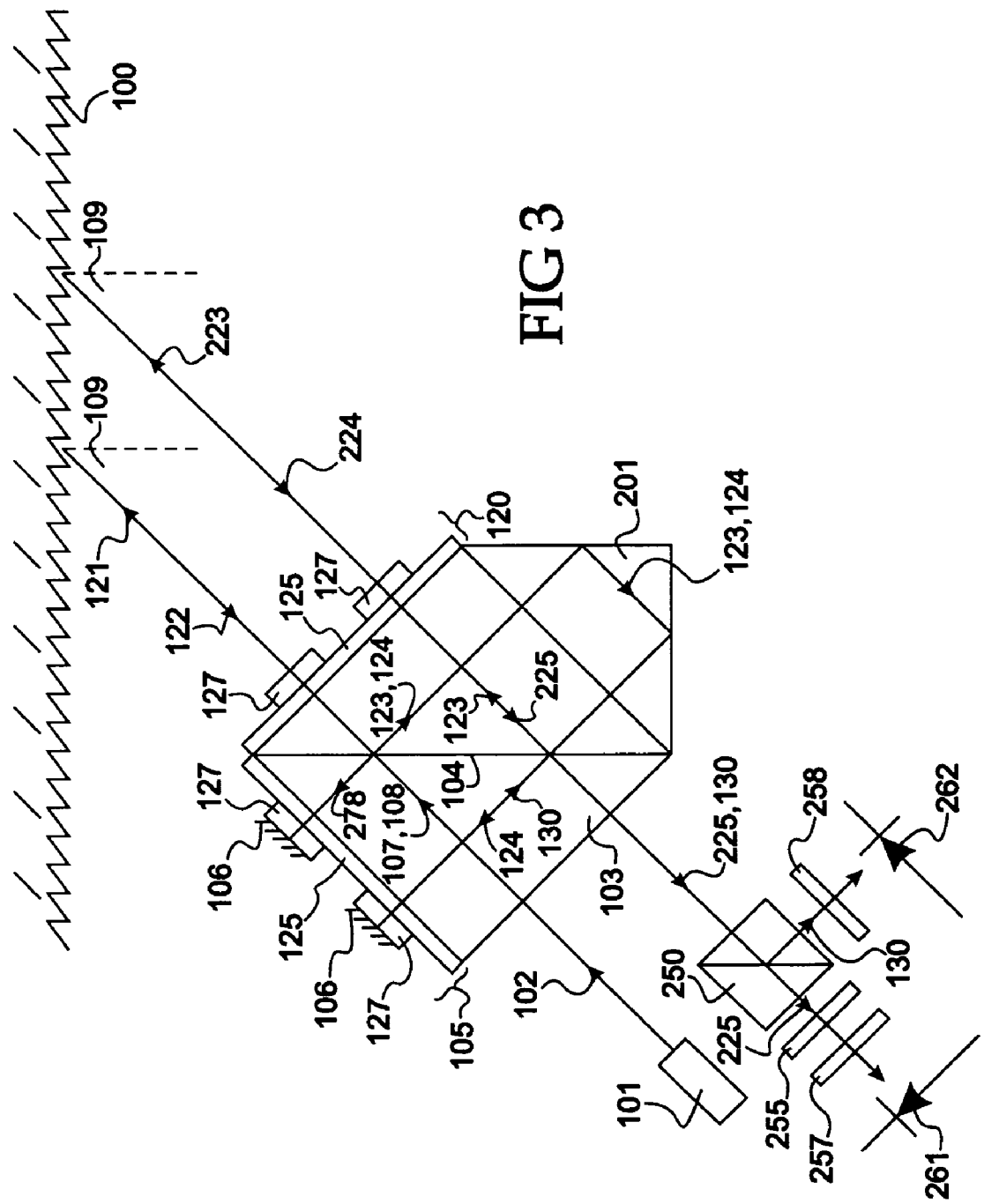
FIG. 3 illustrates a two pass embodiment of an apparatus according to the present teachings adapted for a homodyne light source.

With specific reference to FIG. 3 of the drawings, there is shown an embodiment according to the present teachings adapted for use with a homodyne single frequency light source 101. The operation is similar to the teachings disclosed with respect to FIG. 2 of the drawings. In a homodyne embodiment, the emitted light beam 102 is a single frequency beam 102 that is linearly polarized at approximately 45 degrees to the horizontal so the power in the s-polarization and the p-polarization is substantially equal. The p-polarized component is the measurement beam 107 and the s-polarized component is the reference beam 108. The measurement beam 107 and reference beam 108 follow the same path in the interferometer core 103, retroreflector 201 and to and from the diffraction grating 100 as described with respect to FIG. 2 of the drawings. Accordingly, the two components are labeled with similar reference numbers even though the actual beam of light has different optical properties depending upon a heterodyne or homodyne embodiment. Both FIG. 2 and FIG. 3 of the drawings illustrate an interferometer core 103 and measurement that directs a measurement beam to the diffraction grating 100 at the Littrow angle 109. In the illustrated embodiment of a homodyne system according to the present teachings, the measurement beam 225 and the reference beam 130 combine as they are directed to a detection system. The detection system includes a non-polarizing beam splitter 250 in a path of the output beams 130, 225. The non-polarizing beam splitter 250 transmits a part of the output beams 130, 225 while reflecting the rest of the output beams 130, 225. The transmitted output beams pass a first output retarder 255, which in a specific embodiment is a quarter wave retarder. The retarder is aligned so that it introduces an optical phase shift between the p-polarized measurement beam 225 and the s-polarized measurement beam 130. In a specific embodiment, this optical phase shift is 90 degress. The output beams pass through mixing polarizer 257 before reaching photo detector 261. The reflected output beams 130, 225 pass through the mixing polarizer 258 before reaching photo detector 262.

With specific reference to FIG. 4 of the drawings, there is shown another embodiment according to the present teachings in which two two-pass measurements may be made using a single interferometer core 103. The embodiment of FIG. 4 of the drawings usefully provides two dimensional measurements but because the same interferometer core 103 is used for two different light beams, it does so within a smaller volume than shown in FIGS. 1 through 3 of the drawings. In the embodiment of FIG. 4, first and second reflective prisms 300, 301 are included with the interferometer core 103. The prisms 300, 301 may be unitary with the interferometer core 103 or may be a separate element attached to the interferometer core 103. Without the reflective prisms 300, 301, the apparatus provides two dimensional displacement measurements having measurement beams that diverge as they exit the interferometer core 103. The reflective prisms 300, 301 reflect the light exiting the interferometer core 103 as shown causing the measurement beams to converge rather than diverge prior to engagement with the diffraction grating 100. The convergence of the measurement beams reduces the surface area on the diffraction grating 100 required for the measurement. The configuration illustrated in FIG. 4 of the drawings uses a single interferometer core 103 for two light sources thereby reducing the number of interferometer cores used to make the displacement measurement. In addition, the configuration illustrated in FIG. 4 of the drawings limits the path of travel of the light in air rendering the displacement measurement less sensitive to localized environmental changes in air. The polarization changing devices 105, 120 are disposed between the first and second prisms 300, 301 and the diffraction grating 100. The interferometer core 103 includes the beam splitter interface 104 and retroreflector 201. The prisms 300, 301 include respective reflective surfaces 303, 304 to bend the diverging light beams exiting the interferometer core 103 and directed through the polarization changing devices 105 or 120 and to the diffraction grating 100 towards each other so they converge and hit the diffraction grating 100 within a smaller surface area. In an example embodiment, the reflecting prisms 300, 301 are monolithic with the interferometer core 103 and retroreflector 201 providing a beneficially compact package. Notably, the monolithic structure of the reflecting prisms 300, 301, the interferometer core 103 and the retroreflector 201 may comprise more than one component adhered together with suitable adhesive, by electrostatic forces, or both. In the specific embodiment shown, the first and second polarization changing devices 105, 120 each comprise two quartile portions of the combination halfwave retarder 125 and Faraday rotator 127. Remaining quartile portions of the first and second polarization changing device 105, 120 includes a reflective surface 106, a configuration of which is apparent from the following description of the path taken by respective measurement and reference beams. Beneficially, the dual source embodiment requires only a single beam splitter interface 104 making the interferometer core 103 smaller, lighter and more thermally stable than one with a dual beam splitter.

With specific reference to FIGS. 4, 5, and 6 of the drawings, there is shown a representation of a path of travel of a first measurement beam 107. Edges shown in FIGS. 5 and 6 of the drawings with darker lines, represent the visible edges of the interferometer core 103 shown in FIG. 4 of the drawings. The first measurement beam 107 enters the interferometer core 103 as the s-polarized component of the light beam 102 and is incident on a first incident quadrant 306 of an access face 307 of the interferometer core 103. The first measurement beam 107 reflects at the beam splitter interface 104, enters the first prism 300, reflects at the reflective surface 303 of the first prism 300, and traverses the first polarization changing device 105 in a first transparent quadrant 308 of the first polarization changing device 105. In a specific embodiment, the first transparent quadrant 308 comprises a combination of a halfwave retarder 125 and Faraday rotator 127. Although not shown, a polarizer may be disposed between the Faraday rotator 127 and the diffraction grating 100. The emerging first measurement beam 121 is directed toward the diffraction grating 100 at the Littrow angle 109. The diffraction 122 of the emerging first measurement beam 121 is collinear with the incident emerging measurement beam 121. The diffracted first measurement beam 122 traverses the polarization changing device 105 again in the first transparent quadrant 308 of the first polarization changing device 105 and reflects at the reflective surface 303 of the first prism 300. The traversal of the diffracted first measurement beam 122 through the first polarization changing device 105 changes the polarization to p-polarization. The p-polarized diffracted first measurement beam 123 traverses the beam splitter interface 104, travels through the retroreflector 201, traverses the beam splitter interface 104 again and into the first prism 300 reflecting at the reflective surface 303 of the first prism 300 and toward the polarization changing device 105. The p-polarized diffracted first measurement beam 123 traverses the first polarization changing device 105 at a second transparent quadrant 309 of the first polarization changing device 105 becoming a second pass of the first measurement beam 305. The second pass of the first measurement beam 305 hits the diffraction grating 100 at the Littrow angle 109 and is diffracted. The diffracted second pass of the first measurement beam 304 is collinear with the incident second pass of the first measurement beam 305 and traverses the first polarization changing device 105 again at the second transparent quadrant 309 becoming s-polarized. An s-polarized second pass of the first measurement beam 310 reflects at the reflective surface 303 of the first prism 300 and into the interferometer core 103. Upon re-engagement of the beam splitter interface 104 with the s-polarized second pass of the first measurement beam 310, the s-polarized second pass of the first measurement beam 310 is reflected at the beam splitter interface 104 and exits the interferometer core 103 at the first exit quadrant 302 of the access face 307 and through the mixing polarizer 126.

Figure 7:
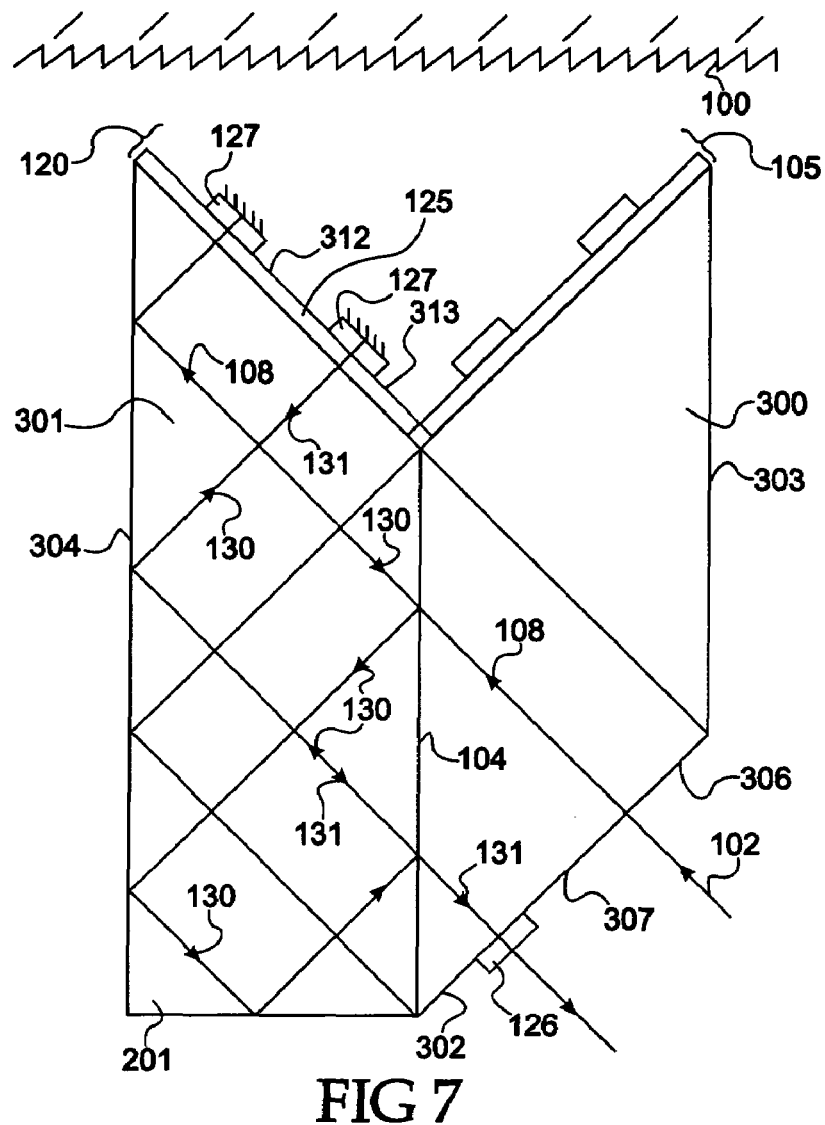
Figure 8:
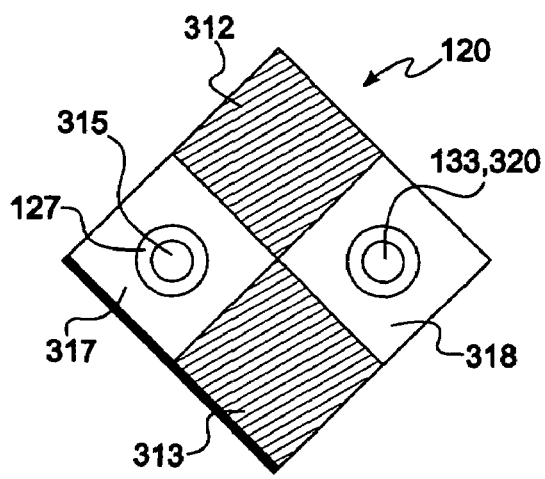

With reference to FIGS. 5, 7 and 8 of the drawings, there is shown a representation of a path of travel of the reference beam 108 in an embodiment of an apparatus according to the present teachings. The edge shown in FIG. 8 of the drawings with a darker line, represents the visible edge of the polarization changing device 120 shown in FIG. 4 of the drawings. The first reference beam 108 enters the interferometer core 103 as the p-polarized component of the first light beam 102 at the first incident quadrant 306 of the access face 307. The reference beam 108 traverses the beam splitter interface 104, into the second prism 301, reflects off of reflective surface 304 of second prism 301, and traverses the second polarization changing device 120 at a first reflective quadrant 312. Because the portion of the second polarization changing device 120 at which the reference beam 108 engages has a reflective surface, the reference beam 108 immediately traverses the second polarization changing device 120 again changing the reference beam to s-polarization. The s-polarized reference beam 130 reflects at the reflective surface 304 of the second prism 301, reflects at the beam splitter interface 104, travels through the retroreflector 201 and again reflects at the beam splitter interface 104. The s-polarized reference beam 130 enters the second prism 301, reflects at the reflective surface 304 of the second prism 301 and is directed to a second reflective quadrant 313 of the second polarization changing device 120. The s-polarized reference beam 130 reflects, traversing the second polarization changing device 120 again in the second reflective quadrant 313 thereby changing the polarization of the s-polarized reference beam 130 to p-polarized light. The p-polarized reference beam 131 enters the second prism 301, reflects at the reflective surface 304 of the second prism 301 and passes into the interferometer core 103 and through the beam splitter interface 104 exiting at the first exit quadrant 302 of the access face 307. The s-polarized first measurement beam 310 and the p-polarized first reference beam 131 combine and exit the interferometer core 103 at the same quadrant of the access face 307 through mixing polarizer 126 for detection and measurement.

Figure 9:
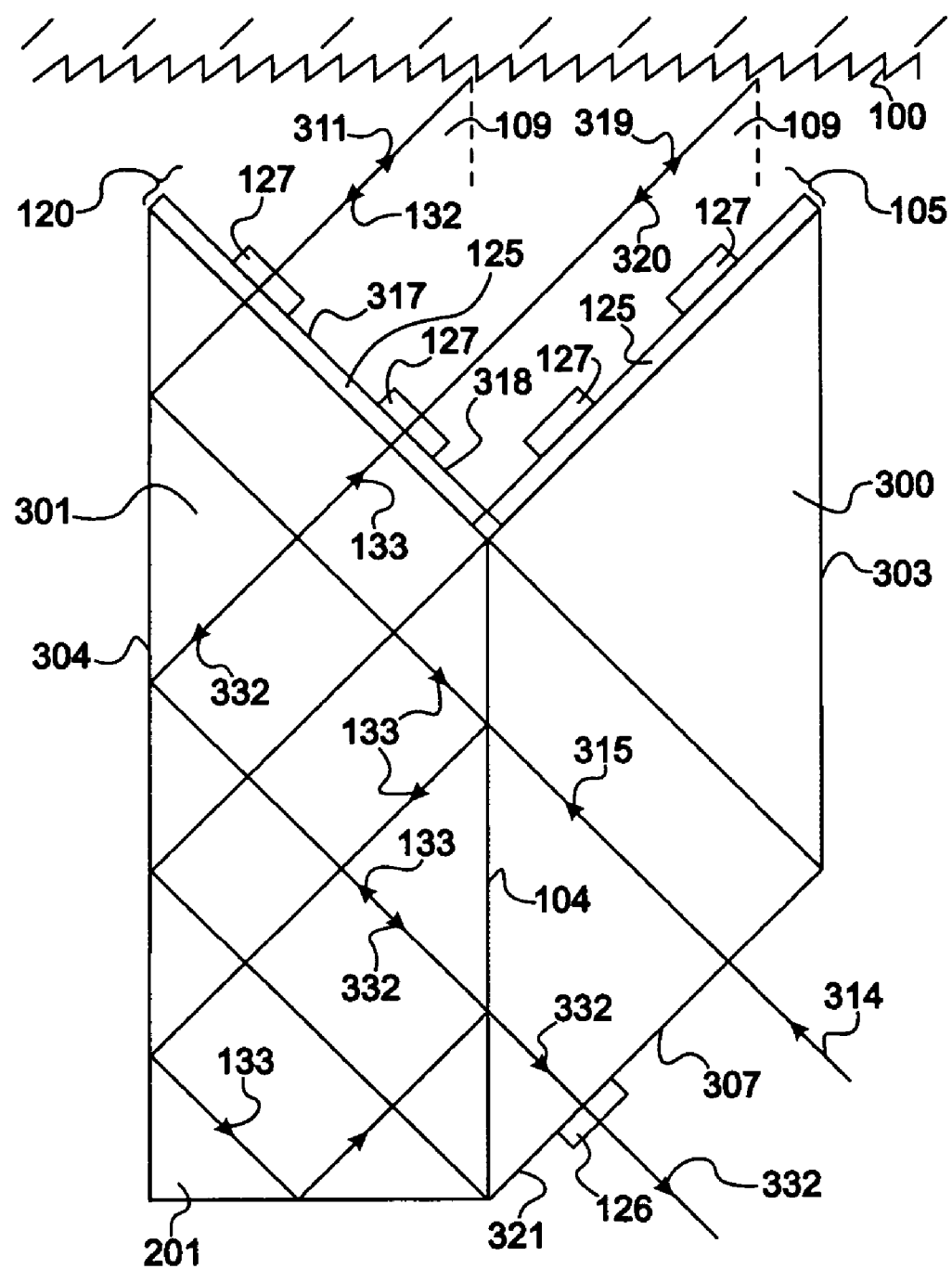

With specific reference to FIGS. 5, 8, and 9 of the drawings, there is shown a representation of a path of travel of a second measurement beam 315 through an interferometer core 103 according to the present teachings. The second measurement beam 315 comprising the p-polarized component of a second light beam 314 enters the interferometer core 103 at a second incident quadrant 316 of the access face 307. The second measurement beam 315 traverses the beam splitter interface 104, reflects at the reflective surface 304 of the second prism 301 and traverses the second polarization changing device 120 at a first transparent quadrant 317. The beam that emerges from the second polarization changing device 120 is a second emerging measurement beam 311 and is directed toward the diffraction grating 100 at the Littrow angle 109. A diffracted second emerging measurement beam 132 is collinear with the incident emerging second measurement beam 311 and traverses the second polarization changing device 120 again in the first transparent quadrant 317 becoming s-polarized before entering the second prism 301. The s-polarized second measurement beam 133 reflects at the reflective surface 304 of the second prism 301, reflects at the beam splitter interface 104, travels through the retroreflector 201, reflects at the beam splitter interface 104 again, reflects at the reflective surface 304 of the second prism 301 and traverses the second polarization changing device 120 at a second transparent quadrant 318 of the second polarization changing device 120. The beam emerges as a second pass of the second measurement beam 319 and is directed toward the diffraction grating 100 at the Littrow angle 109. A diffracted second pass of the second measurement beam 320 is collinear with the incident beam, traverses the second polarization changing device 120 becoming p-polarized. The p-polarized second pass of the second measurement beam 332 reflects at the reflective surface 304 of the second prism 301 traverses the beam splitter interface 104 and exits the interferometer core 103 at a second exit quadrant 321 of the access face 307.

Figure 10:
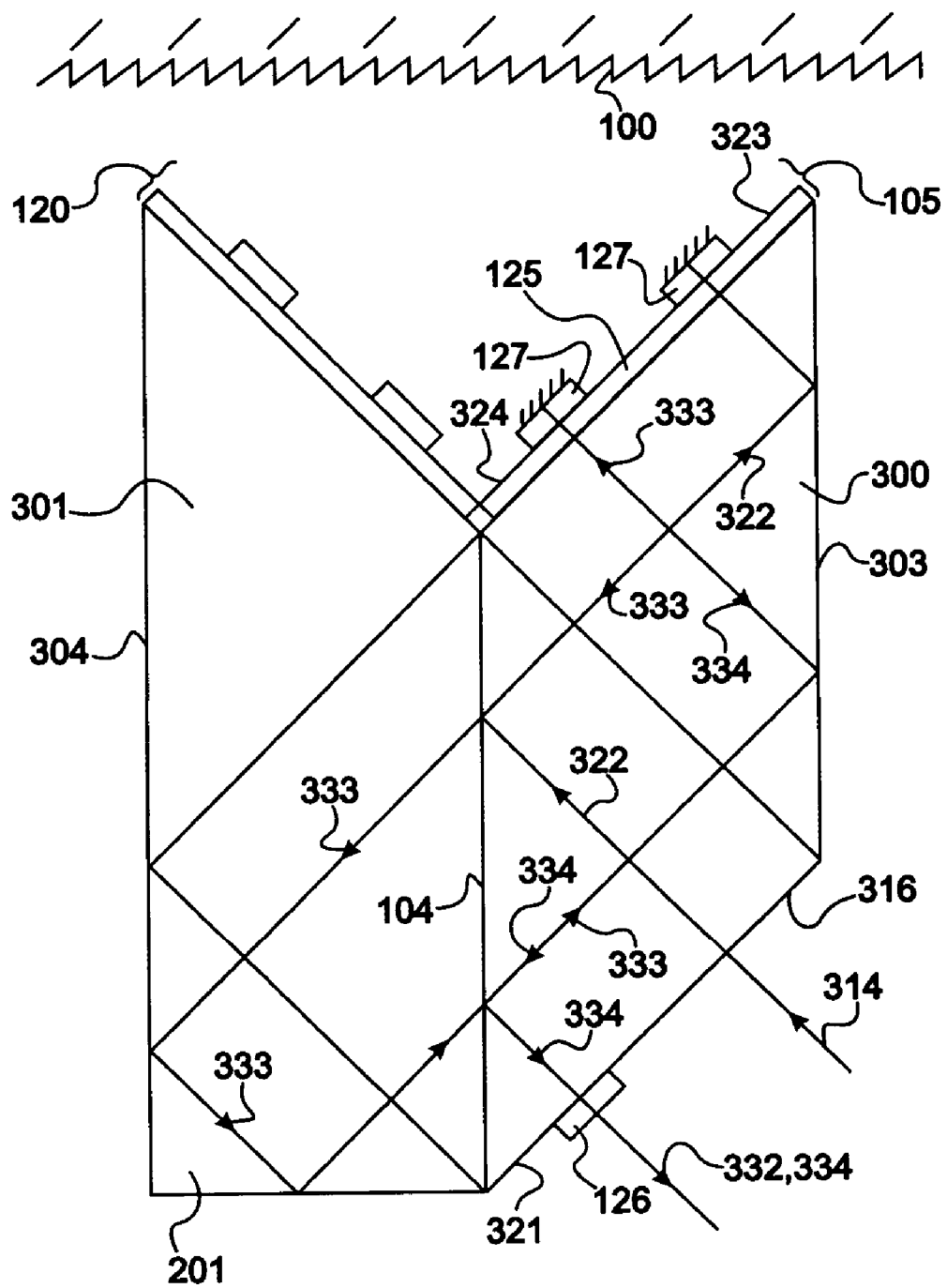

With reference to FIGS. 5, 6 and 10 of the drawings, there is shown a representation of a path of travel of a second reference beam 322. The second reference beam 322 enters the interferometer core 103 as the s-polarized component of the second light beam 314 at the second incident quadrant 316 of the access face 307. The second reference beam 322 reflects at the beam splitter interface 104, reflects at the reflective surface 303 of the first prism 300 and traverses the first polarization changing device 105 at a first reflective quadrant 323. Because the portion of the first polarization changing element 105 at which the second reference beam 322 engages has a reflective surface, the second reference beam 322 immediately traverses the first polarization changing device 105 again changing the polarization of the beam 322 to p-polarization. The p-polarized reference beam 333 traverses the beam splitter interface 104, travels through the retroreflector 201 and again traverses the beam splitter interface 104 reflects at the reflective surface 303 of the first prism 300 and traverse the first polarization changing device 105 at a second reflective quadrant 324 of the first polarization changing device 105. The beam reflects, traversing the first polarization changing device 105 again thereby changing the polarization of the beam to s-polarized light. The s-polarized second reference beam 334 reflects at the reflective surface 303 of the first prism 300, reflects at the beam splitter interface 104 and exits at the second exit quadrant 321 of the access face 307. The p-polarized diffracted second pass of the second measurement beam 332 and the second reference beam 334 combine through mixing polarizer 126 and exit the interferometer core 103 at the same quadrant of the access face 307 for detection and measurement.

Figure 11:
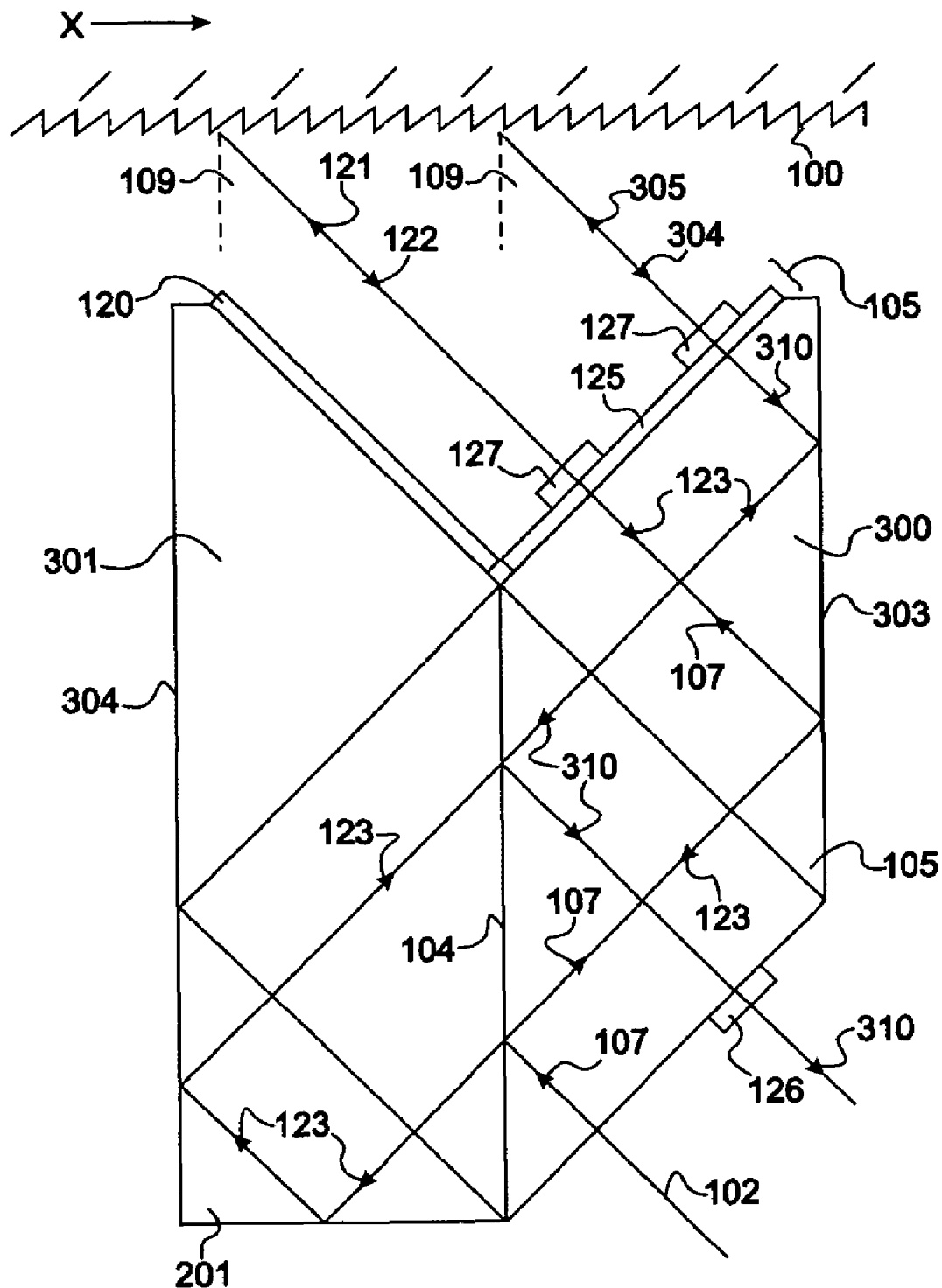
FIGS. 11 and 12 illustrate another embodiment according to the present teachings that determines displacement in one direction and is insensitive to displacement is another direction.
Figure 12:
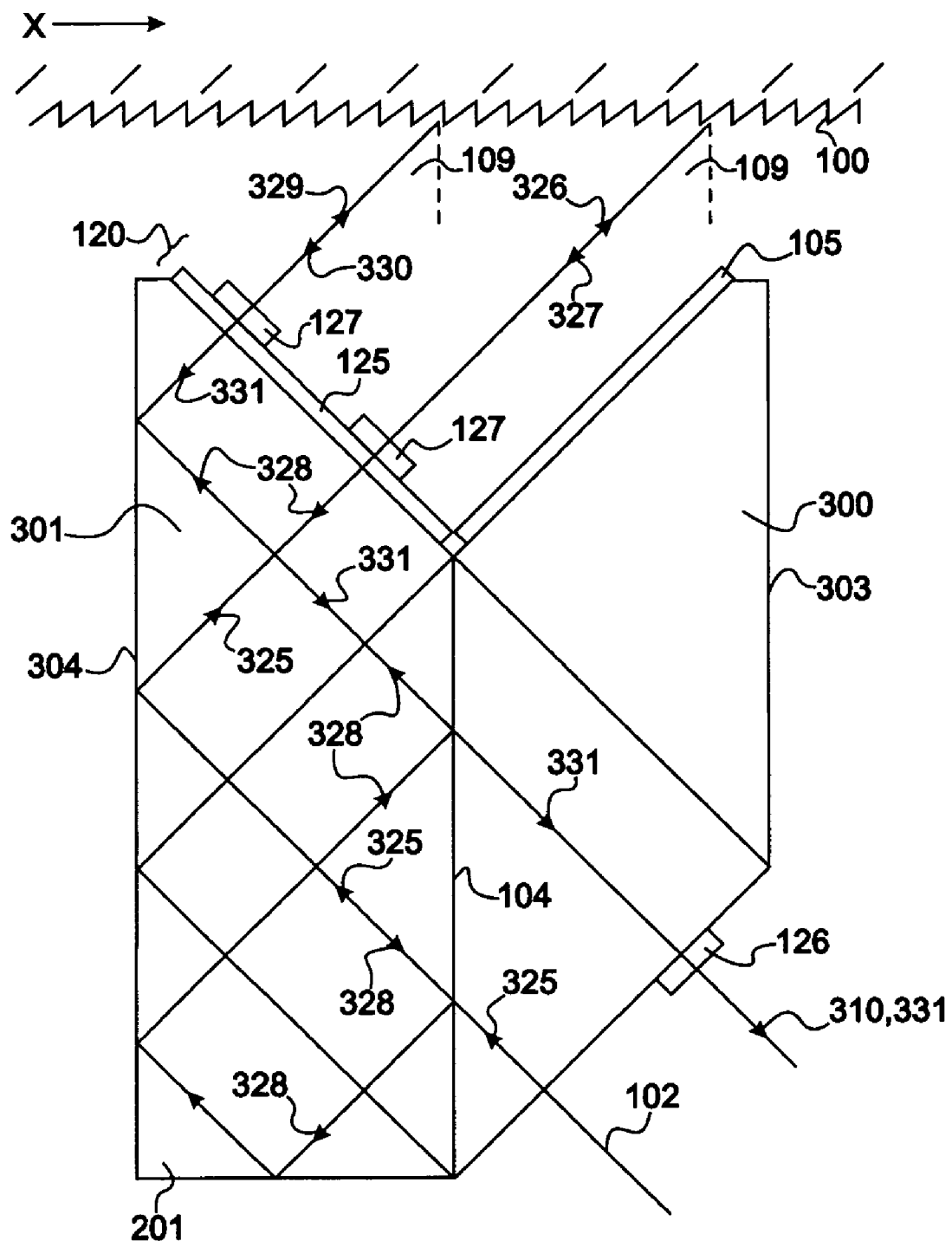

With specific reference to FIGS. 11 and 12 of the drawings, there is shown another embodiment according to the present teachings in which displacement is measured in the x-direction, and the measurement is insensitive to displacement in the z-direction. The interferometer core 103 and the paths of the light beams are very similar to those shown in FIGS. 4 through 10 of the drawings. In the embodiment of FIGS. 11 and 12, the reflective surface 106 is removed allowing all components of the light beams to reach the diffraction grating 100. In this embodiment, the light beam 102 is split at the beam splitter interface 104 into the measurement beam 107 and a companion measurement beam 325. Each beam 107, 325 follows a path through the interferometer core 103 and to and from the diffraction grating. The first measurement beam 107 is the s-polarized component of the light beam 102 and follows the same path as that disclosed in FIG. 7 of the drawings. The companion measurement beam 325 is the p-polarized component of the light beam 102. The companion measurement beam 325 traverses the beam splitter interface 104, reflects off the reflective surface 304 of the second prism 301 and traverses through the second polarization changing device 120. An emerging companion measurement beam 326 is incident on the diffraction grating 100 at the Littrow angle 109. A diffraction 327 of the emerging companion measurement beam 326 is collinear with the incident beam and traverses through the polarization changing device 120 changing the polarization of the beam to an s-polarization. An s-polarized companion measurement beam 328 reflects off reflective surface 304 of the second prism 301 and into the interferometer core 103. The s-polarized companion measurement beam 328 reflects at the beam splitter interface 104, travels through the retroreflector 201, reflects at the beam splitter interface 104, reflects at the reflective surface 304 of the second prism 301 and through the polarization changing device 120. A second pass emerging companion measurement beam 329 is incident on the diffraction grating 100 at the Littrow angle 109. A diffraction 330 of the second pass emerging companion measurement beam 329 is collinear with the incident beam and traverses the second polarization changing device 120 again changing the beam to p-polarization. A p-polarized companion measurement beam 331 traverses the beam splitter interface 104 and through mixing polarizer 126. The s-polarized first measurement beam 310 and the p-polarized companion measurement beam 331 combine and interfere as they pass through the mixing polarizer 126 to the detector (not shown). The interference of the two signals generates fringes that are indicative of displacement of the diffraction grating 100 only in one direction and are insensitive to displacement of the diffraction grating 100 in the other two directions. Displacement of the diffraction grating 100 using the illustrated two-pass embodiment may be calculated as:

$$\Delta x = \frac{Np}{4} \quad (5)$$

As one of ordinary skill in the art appreciates, this embodiment is also suitable for homodyne or heterodyne operation. As one of ordinary skill in the art also appreciates, similar but different calculations apply to the displacement measurement in on pass embodiments and more than two pass embodiments.

With specific reference to FIGS. 13 through 18, there is shown another embodiment of an interferometer according to the present teachings. The specific embodiment shown in FIGS. 13 through 18 includes input splitting optics 360 comprising an input non-polarizing beam splitter 361 and input prism 362. In a specific embodiment, an input light beam 363 is a heterodyne beam. However, one or more alternative embodiments may suitably use a homodyne source. The non-polarizing beam splitter cube 361 passes approximately half of the light and reflects the other half. The half that is transmitted through the beam splitter is reflected at a reflective surface of the input prism 362. The result is first and second input light beams 364, 365, respectively. The first and second light beams 364, 365 have approximately equal power and enter the interferometer core 103 parallel and offset in space from each other.

Figure 13:
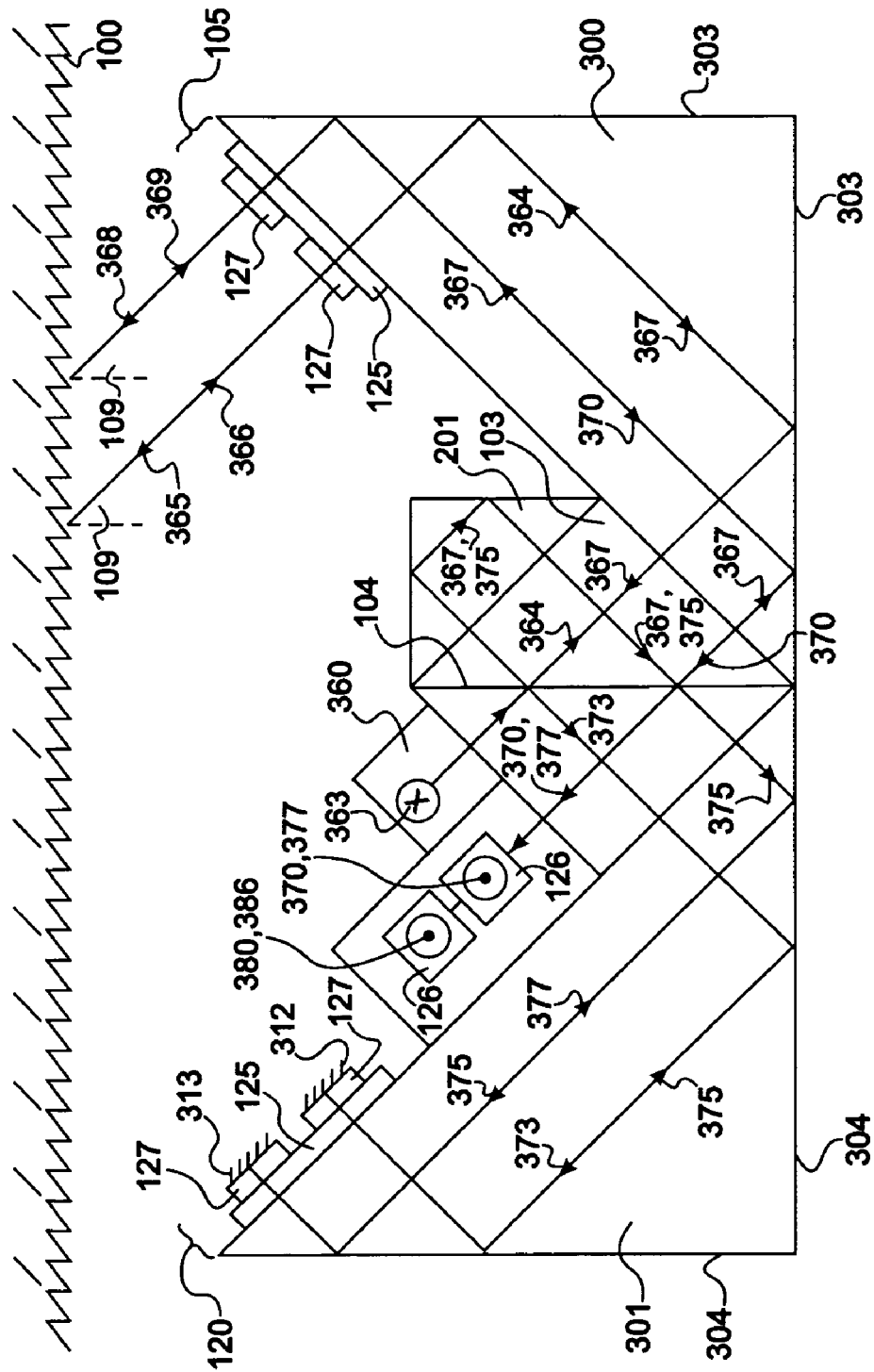

With specific reference to FIG. 13 of the drawings, paths of first measurement and reference beams are described. The p-polarized component of the first input beam 364 enters the interferometer core 103, traverses the beam splitter interface 104, and into the first prism 300. In the embodiment of FIG. 13, the first and second prisms 300, 301 each have two reflective surfaces 303, 304 perpendicular to each other. The p-polarized component of the first input light beam 364 reflects twice off the two reflective surfaces 303 and traverses the first polarization changing device 105. A first emerging measurement beam 366 is incident on the diffraction grating 100 at the Littrow angle 109. A diffraction 359 of the first emerging beam 366 is collinear with the first emerging beam 366 and traverses the first polarization changing device 105 again becoming s-polarized. An s-polarized first measurement beam 367 reflects twice in the first prism 300. The s-polarized first measurement beam 367 reflects at the beam splitter interface 104, travels through the retroreflector 201, again at the beam splitter interface 104 and enters the first prism 300. The s-polarized first measurement beam 367 reflects twice at the reflective surfaces 303 of the first prism 300 and through the first polarization changing device 105. An emerging second pass of the first measurement beam 368 is incident on the diffraction grating 100 at the Littrow angle 109 and a collinear diffraction 369 of the emerging second pass of the first measurement beam 368 traverses the first polarization changing device 105 again becoming p-polarized. The p-polarized first measurement beam 370 reflects at the two reflective surfaces 303 of the first prism 300 and traverses the beam splitter interface 104. With specific reference to FIG. 18, the p-polarized first measurement beam 370 exits the interferometer core 103 through an output prism 371. The p-polarized first input beam 370 reflects at output reflection surface 372 and exits the output prism 371 through mixing polarizer 126.

With specific reference to FIG. 13, the s-polarized component of the first input beam 373 reflects at the beam splitter interface 104 and reflects twice off reflective surfaces 304 of the second prism 301. The s-polarized component of the first input beam 373 traverses the second polarization changing device 120, reflects off first reflective quadrant 312 of the second polarization changing device 120 and traverses the second polarization changing device 120 again to change the beam to a p-polarized first reference beam 375. The p-polarized first reference beam 375 reflects twice at the reflective surfaces 304 of the second prism 301, traverses the beam splitter interface 104, through the retroreflector 201, through the beam splitter interface 104, and reflects twice at the reflective surfaces 304 of the second prism 301. The p-polarized first reference beam 375 traverses the second polarization device 120 at the second reflective quadrant 313 of the second polarization changing device 120, reflects, and traverses the second polarization changing device 120 again changing the beam to an s-polarized first reference beam 377. FIGS. 16 and 17 of the drawings represent a configuration of the first and second polarization changing devices 105, 120 where the darker lines represent edges of the devices 105, 120 visible from the views shown in FIGS. 13 and 14 of the drawings. The s-polarized first reference beam 377 reflects twice at the reflective surfaces 304 of the second prism 301, reflects at the beam splitter interface 104 exiting the interferometer core 103 and into the output prism 371. The s-polarized reference beam 377 reflects at the output reflection surface 372 and exits the output prism 371 through mixing polarizer 126 to combine with the p-polarized first measurement beam 370.

Figure 14:
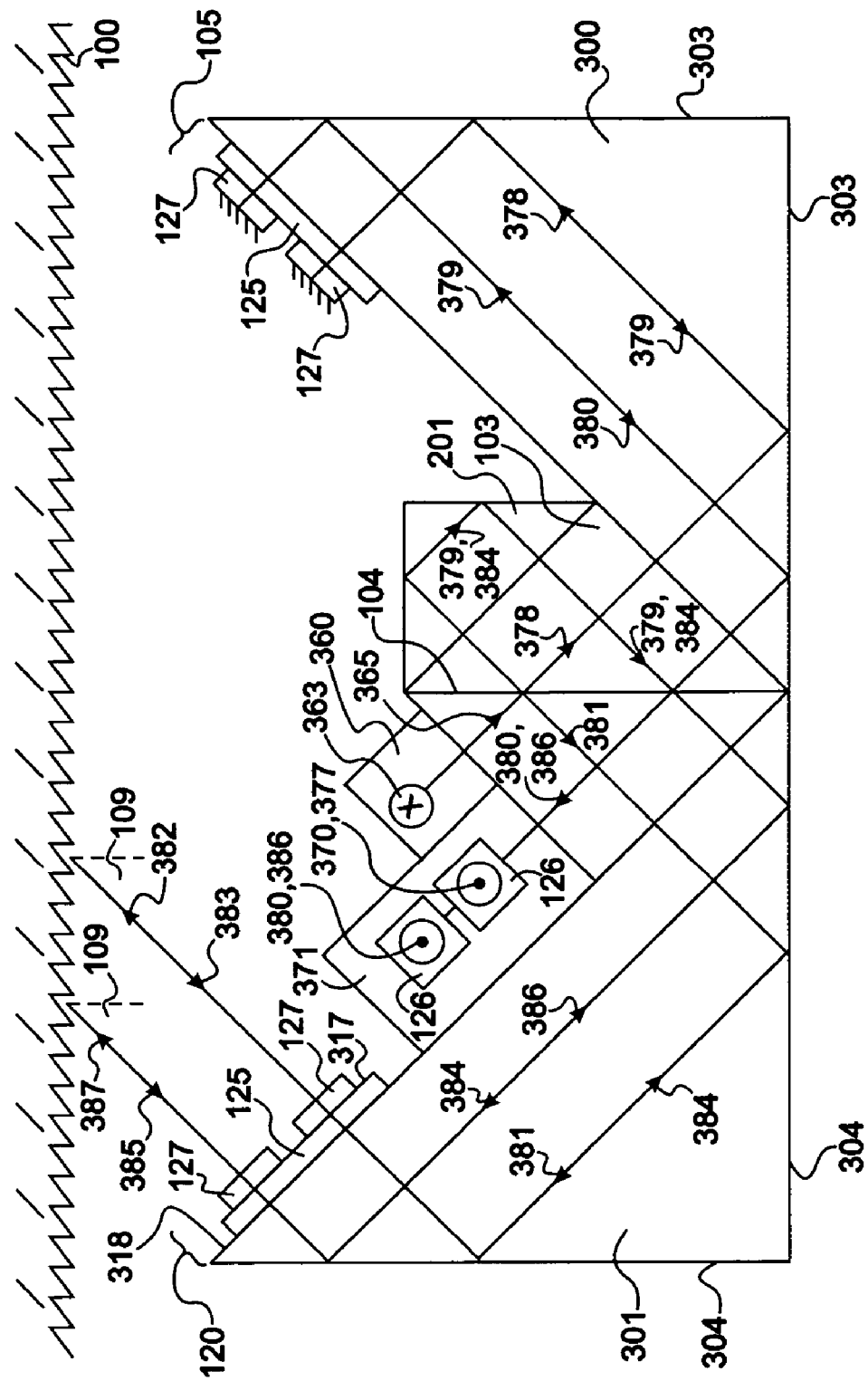

With specific reference to FIG. 14 of the drawings, paths of the second measurement and reference beam are described in which the second input light beam 365 traverses the non-polarizing beam splitter and reflects at input prism 362 before entering the interferometer core 103. The p-polarized component of the second input light beam 378 is the second reference beam and it traverses the polarizing beam splitter interface 104, reflects off reflective surfaces 303 of the first prism 300 and traverses the first polarization changing device 105 at the first reflective quadrant 323. The beam reflects, traversing the first polarization changing device 105, reflects, traversing the first polarization changing device 105 again changing the beam to an s-polarization. The s-polarized second reference beam 379 reflects are both surfaces 303 of the first prism 300, reflects at the beam splitter interface 104, travels through the retroreflector 201, reflecting again at the beam splitter interface 104, reflecting twice at both surfaces 303 of the first prism 300 and traversing the first polarization changing device 105 at the second reflective quadrant 324. The beam reflects, traversing the first polarization changing device 105 again changing the polarization to a p-polarization. The p-polarized second reference beam 380 reflects at both surfaces 303 of the first prism 300, traverses the beam splitter interface 104 and into output prism 371. The p-polarized second reference beam 380 reflects at the output reflection surface 372 and traverses the mixing polarizer 126.

With specific reference to FIG. 14, the s-polarized component of the second input light beam 365 is the second measurement beam 381. The second measurement beam 381 reflects at the beam splitter interface 104, reflects twice at the surfaces 304 of the second prism 301 and traverses second polarization changing device 120 at the first transparent quadrant 317. The emerging second measurement beam 382 is incident on the diffraction grating 100 at the Littrow angle 109 and the collinear reflection 383 of the emerging second measurement beam 382 traverses the second polarization changing device 120 again at the first transparent quadrant 317 changing the beam polarization to p-polarization. The p-polarized second measurement beam 384 reflects twice at the surfaces 304 of the second prism 301, traverses the beam splitter interface 104, travels through the retroreflector 201, traverses the beam splitter interface 104 again, reflects twice at the surfaces 304 of the second prism 301 for in its second pass, and traverse the second polarization changing device 120 at the second transparent quadrant 318. A second emerging second measurement beam 387 is incident on the diffraction grating 100 at the Littrow angle 109 and a collinear reflection 385 of the second emerging second measurement beam 387 traverses the second polarization changing device 120 again becoming s-polarized. The s-polarized second measurement beam 386 reflects off both surfaces 304 of the second prism 301 and reflects again at the beam splitter interface 104. The s-polarized second measurement beam 386 exits the interferometer core 103 and enters the output prism 371 reflecting off the output reflection surface 372 and combining with the p-polarized second reference beam 380 at the mixing polarizer 126.

Figure 19:
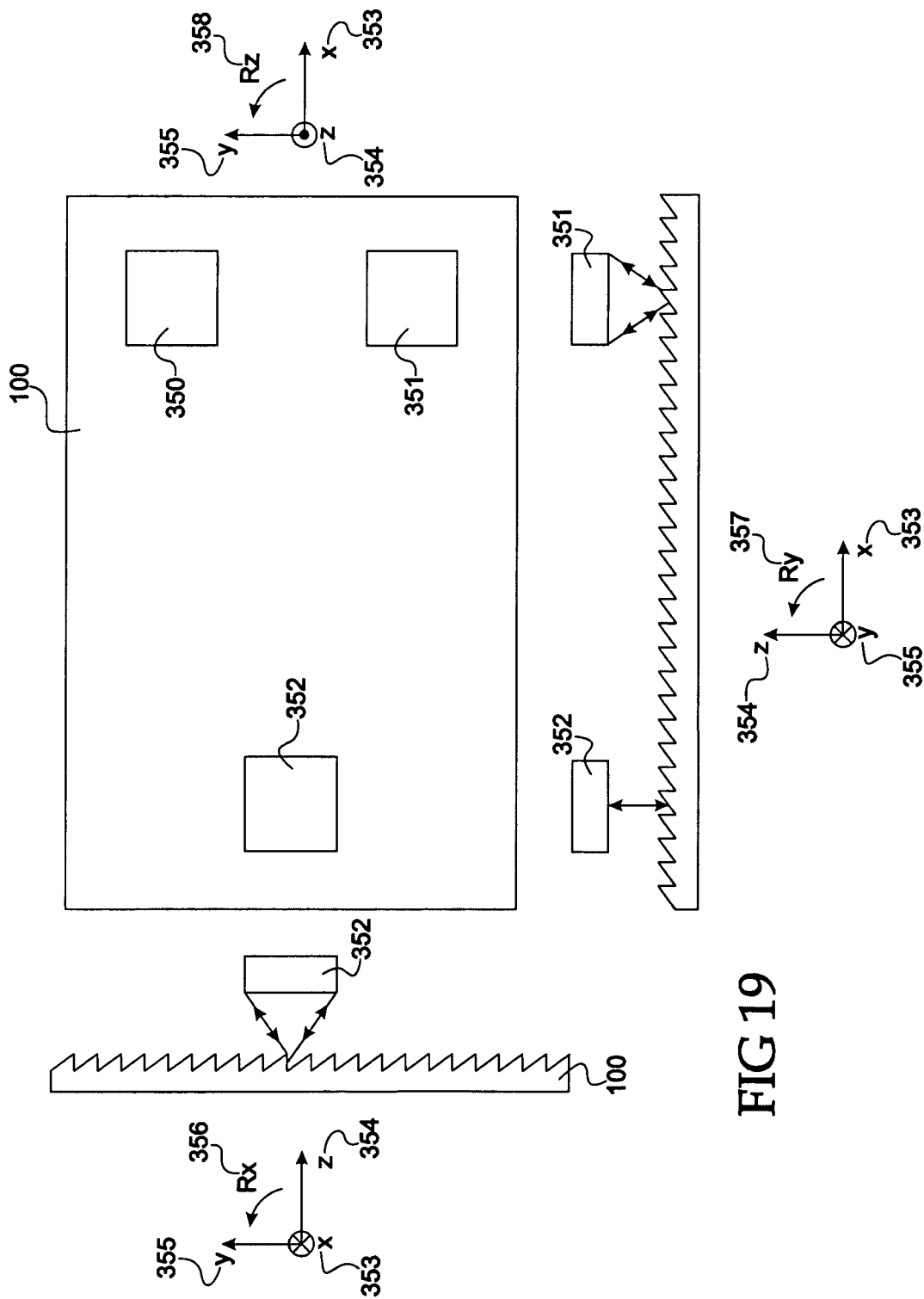
FIG. 19 illustrates an application suitable for use with embodiments of the present teachings.

With specific reference to FIG. 19 of the drawings, there is shown an embodiment of an application of an interferometry system according to the present teachings. FIG. 19 of the drawings illustrates a plan view of a groove side of the diffraction grating 100 and two elevations showing a position of interferometers relative to the diffraction grating 100. The diffraction grating 100 may be attached to a precision stage such as one used as part of a machine tool or a semiconductor chip lithography system or may be part of any other system that uses precision displacement measurements. For purposes of the present disclosure, a coordinate system is defined relative to the diffraction grating 100. The diffraction grating 100 lies in a plane defined by an x-direction 353 and a y-direction 355. A z-direction 354 is perpendicular to the plane of the diffraction grating 100. Three additional coordinates, Rx 356, Ry 357, and Rz 358 are also defined to describe rotation of the diffraction grating about the x-axis 353, y-axis 355 and z-axis 354, respectively. In a system that uses the interferometer embodiment shown in FIGS. 13 through 18 of the drawings, each interferometer 350, 351, and 352 measures two separate dimensions. First 350, second 351 and third 352 interferometers are positioned at locations on the diffraction grating 100. The first and second interferometers 350, 351 measure displacement in the x- and z-directions and the third interferometer 352 measures displacement in the y- and z-directions. From the displacement measurements, it is possible to further calculate rotational displacement about each of the axes. In a specific embodiment, displacement in the x-direction 353 is calculated from an average of the x-direction displacement measurements from the first and second interferometers 350, 351. Displacement in the y-direction 355 is calculated from the displacement measurement at the third interferometer 352. Displacement in the z-direction 354 is calculated from an average of the z-direction displacement measurements from the first and second interferometers 350, 351. Rotation about the x-axis, Rx 356, may be calculated from a difference in the z-direction measurements. Rotation about the y-axis, Ry 357, may be calculated from a difference between the z-direction displacement from the third interferometer 352 and an average of the z-direction displacement from the first and second interferometers 350, 351. Rotation about the z-axis, Rz 358, may be calculated from a difference between the x-direction displacements of the first and second interferometers 350, 351.

Alternative embodiments include a system with more than three interferometers. The additional interferometers may be used for purposes of redundancy and self-consistency check to provide enhanced confidence in the measurements made. Fewer interferometers are also possible if displacement along one or more of the directions is not of interest. In a specific embodiment, the diffraction grating is approximately 500 mm by 500 mm. Alternatively, two or more separate diffraction gratings may be used, each diffraction grating being separately illuminated. If separate retarders are used, it is not necessary that they exist is the same plane or relative orientation. Provided that a processor that receives the measurements has a priori knowledge of the various orientations, appropriate measurements may be calculated taking the specific system configuration and diffraction grating orientations into account. In a specific embodiment, the diffraction grating 100 has a set of grooves in a first orientation and another set of grooves in a second orientation. The first and second orientations may be substantially perpendicular to each other or at some other relative angle. The pitch of the grooves in the first and second orientations need not be the same and the diffraction grating may have grooves in just a first orientation. Beneficially, because the interferometers according to the present teachings may be separately adjusted, it is possible to optimize the measurement made with each interferometer and to calibrate out measurement errors as a result of misalignments. Many other system embodiments will occur to one of ordinary skill in the art given benefit of the present teachings.

Certain embodiments according to the present teachings are described herein for purposes of illustration. Other embodiments not specifically mentioned will occur to one of ordinary skill with benefit of the present teachings even though they are not specifically described and are considered to be within the scope of the appended claims. For example, the geometries of the prisms and associated output faces may be varied according to the specific Littrow angle requirements. Beneficially, it is possible to maintain a consistent geometry for the interferometer core while adapting to different diffraction grating parameters. In the disclosed embodiment, egress of the measurement and reference beams through first and second polarization changing devices 105, 120 are described with reference to transparent and reflective quadrants. The present teachings may be expanded for more than two light beams wherein the first and second polarization changing devices are functionally defined in terms of additional transparent and reflective sections. Therefore, embodiments and illustrations herein are meant to be illustrative and the scope of the present teachings is limited only by the appended claims.

We claim:
1. An apparatus for measuring displacement comprising:
    a light beam directed to an interferometer core, the interferometer core adapted to split the light beam into first and second component beams wherein the first component beam is directed to a diffraction grating, at substan- tially a Littrow angle and is received by the interferometer core, and combines with the second component beam, the interferometer core directing the combined first and second component beams to a detector to obtain a measurement of the combined first and second component beams, and a processor converting the measurement to displacement of the diffraction grating, wherein a path of the measured displacement of the diffraction grating is not confined to be orthogonal to the component beam incident to the diffraction grating.

2. An apparatus as recited in claim 1 wherein the first component beam is a measurement beam and the second component beam is a reference beam.

3. An apparatus as recited in claim 1 wherein the first component beam is a measurement beam and the second component beam is a companion measurement beam.

4. An apparatus as recited in claim 1 wherein the light beam is split into first and second beams and further wherein the first light beam comprises measurement and reference components and the second light beam comprises measurement and reference components.

5. An apparatus as recited in claim 1 wherein a dual frequency light source emits the light beam.

6. An apparatus as recited in claim 5 wherein the light beam comprises two orthogonally polarized light beams.

7. An apparatus as recited in claim 1 wherein the light beam comprises a single frequency light source.

8. An apparatus as recited in claim 1 and further comprising a retroreflector adapted to provide a two pass measurement beam path of travel.

9. An apparatus as recited in claim 8 wherein the retroreflector is adapted to provide a two pass reference beam path of travel.

10. An apparatus as recited in claim 9 wherein the measurement beam path of travel and the reference beam path of travel are substantially the same within the interferometer core.

11. An apparatus as recited in claim 1 wherein the light beam is a first light beam and further comprising a second light beam incident on the interferometer core.

12. An apparatus as recited in claim 11 wherein the second light beam is derived from a dual frequency light source having orthogonally polarized light beams.

13. An apparatus as recited in claim 12 wherein the first and second light beams are split into first and second measurement beams, respectively, and first and second reference beams, respectively, and wherein the interferometer further comprises redirection optics for converging the first and second measurement beams on the diffraction grating at substantially the Littrow angle.

14. An apparatus as recited in claim 13 wherein the beam splitter and redirection optics are monolithic with the interferometer core.

15. An apparatus as recited in claim 11 and further comprising a retroreflector adapted to provide a two pass first measurement beam path of travel and a two pass second measurement beam path of travel.

16. An apparatus as recited in claim 15 the retroreflector adapted to provide a two pass first reference beam path of travel and a two pass second reference beam path of travel.

17. An apparatus as recited in claim 16 wherein the two pass first measurement beam path of travel and the two pass first reference beam path of travel are substantially the same within the interferometer core.

18. An apparatus as recited in claim 1 wherein the interferometer core further includes at least one polarization changing device.

19. An apparatus as recited in claim 18 wherein the polarization changing device comprises a quarterwave plate.

20. An apparatus as recited in claim 18 wherein the polarization changing device comprises a combination of a halfwave retarder and a Faraday rotator.

21. An apparatus as recited in claim 20 the polarization changing device further comprising a polarizer disposed between the Faraday rotator and the diffraction grating.

22. An apparatus as recited in claim 18 wherein the polarization changing device has two diagonally disposed quadrants having a reflective surface and two diagonally disposed transparent quadrants.

23. A method for measuring displacement of a diffraction grating comprising:
  splitting a light beam into first and second component light beams,
  directing the first component light beam at the diffraction grating at a Littrow angle, wherein a path of measured displacement of the diffraction grating is not confined to be orthogonal to the component beam incident to the diffraction grating,
  receiving a diffraction of the first component light beam,
  combining the diffraction of the first component light beam with the second component light beam, and
  measuring the combined first and second component light beams to determine the displacement of the diffraction grating.

24. A method as recited in claim 23 wherein the first component light beam is a measurement beam and the second component light beam is a reference beam.

25. A method as recited in claim 23 wherein the first component beam is a measurement beam and the second component beam is a companion measurement beam.

26. A method as recited in claim 25 and further comprising directing the companion measurement beam at the diffraction grating at approximately the Littrow angle and receiving a diffraction of the companion beam.

27. A method as recited in claim 23 wherein the step of splitting comprises splitting the light beam according to a state of polarization.

28. A method as recited in claim 23 wherein the light beam comprises a first light beam the method further comprising splitting a second light beam into first and second component light beams, directing the first component of the first light beam at the diffraction grating at approximately the Littrow angle and directing the first component of the second light beam at the diffraction grating at approximately the Littrow angle in a direction opposite the angle of the first component of the first light beam.

29. A method as recited in claim 28 and further comprising splitting the light beam into first and second beams wherein the step of splitting a light beam splits the first beam into first and second component beams and further comprising splitting the second beam into first and second component beams.

30. A method as recited in claim 23 wherein the light beam is derived from a dual frequency light source.

31. A method as recited in claim 23 wherein the light beam is derived from a single frequency light source.

32. A method as recited in claim 30 wherein the dual frequency light source provides two orthogonally polarized light beams.

33. A method as recited in claim 23 wherein directing further comprises directing the first component light beam at a diffraction grating at substantially the Littrow angle more than once before combining the first component light beam with the second component light beam.

34. An apparatus comprising:
a light source adapted to emit a light beam,
a diffraction grating,
a detector,
an interferometer core having a polarizing beam splitter interface, the polarizing beam splitter interface adapted to split the light beam into first and second component beams, the interferometer core disposed between the light source and the diffraction grating and positioned to receive the light source and direct at least the first component beam toward the diffraction grating at substantially a Littrow angle, wherein a path of measured displacement of the diffraction grating is not confined to be orthogonal to the component beam incident to the diffraction grating and
output optics adapted to combine the first component beam with the second component beam before measurement at the detector.

35. An apparatus as recited in claim 34 wherein the light source is a dual frequency light source.

36. An apparatus as recited in claim 34 wherein the light source is a single frequency light source.

37. An apparatus as recited in claim 34 wherein the first and second component beams are orthogonally polarized with respect to each other.

38. An apparatus as recited in claim 34 and further comprising polarization changing devices disposed between the interferometer core and the diffraction grating.

39. An apparatus as recited in claim 38 wherein at least one of the polarization changing devices comprises a quarterwave retarder.

40. An apparatus as recited in claim 38 wherein at least one of the polarization changing devices comprises a combination of a halfwave retarder and a Faraday rotator.

41. An apparatus as recited in claim 38, wherein at least a portion of the polarization changing devices further comprise a reflective surface.

42. An apparatus as recited in claim 34 and further comprising a retroreflector.

43. An apparatus as recited in claim 34 and further comprising input optics including a nonpolarizing beam splitter adapted to split the light beam into first and second light beams.

44. An apparatus as recited in claim 43 wherein first and second light beams are received by the interferometer core.

45. An apparatus as recited in claim 34 wherein the light beam comprises a first light beam and further comprising a second light beam received by the interferometer core.

46. An apparatus as recited in claim 45 and further comprising first and second prisms adapted to converge the component beams on the diffraction grating.

47. An apparatus as recited in claim 46 the prisms adapted to reflect the light beam at least once between the interferometer core and the diffraction grating.

48. An apparatus as recited in claim 46 the prisms adapted to reflect the light beam twice between the interferometer core and the diffraction grating.

49. An apparatus as recited in claim 34 wherein the output optics comprise a mixing polarizer.

50. An apparatus as recited in claim 49 wherein the output optics further comprise an output prism are adapted to receive, reflect, and combine the first and second component beams.

51. An apparatus as recited in claim 34 the diffraction grating further comprising a first set of grooves disposed in a first direction and a second set of grooves disposed in a second direction, the apparatus further comprising a light source, detector and interferometer core responsive to the first set of grooves and a light source, detector and interferometer core responsive to the second set of grooves.

52. An apparatus as recited in claim 18 wherein the polarization changing device has a reflective surface.

53. An apparatus as recited in claim 18 wherein a first portion of the polarization changing device has a reflective surface and a second portion of the polarization changing device has a transparent surface.

54. An apparatus as recited in claim 1 and further comprising a second light beam, second interferometer core, and second detector, the second interferometer core adapted to split the second light beam into first and second component beams wherein the first component beam of the second light beam is directed to the diffraction grating, at substantially the Littrow angle and is received by the second interferometer core, and combines with the second component beam of the second light beam, the second interferometer core directing the combined first and second component beams of the second light beam to the second detector to obtain a measurement of the combined first and second component beams of the second light beam, the first and second light beams, interferometer cores, and detectors measuring displacement in first and second axes orthogonal to each other.

55. An apparatus as recited in claim 54 and further comprising a third light beam, third interferometer core, and third detector, the third interferometer core adapted to split the third light beam into first and second component beams wherein the first component beam of the third light beam is directed to the diffraction grating, at substantially the Littrow angle and is received by the third interferometer core, and combines with the second component beam of the third light beam, the third interferometer core directing the combined first and second component beams of the third light beam to the third detector to obtain a measurement of the combined first and second component beams of the third light beam, the third light beam, third interferometer core, and third detector measuring displacement in the first axis and a third axis, the third axis being orthogonal to the first and second axes.

56. An apparatus as recited in claim 54, wherein the diffraction grating comprises a first set of grooves along a first orientation and a second set of grooves along a second orientation.

* * * * *